Patented Nov. 24, 1936

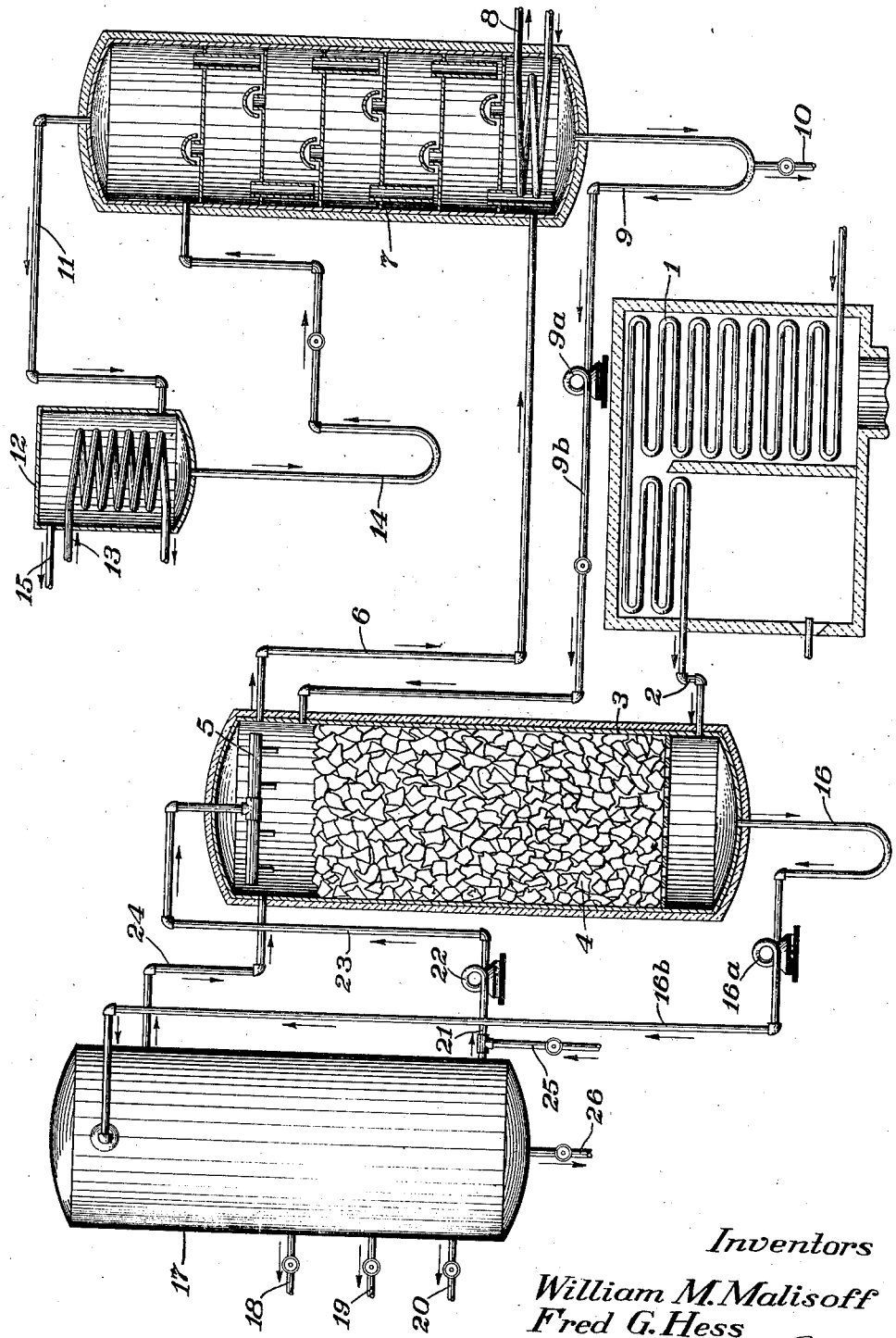

2,061,583

UNITED STATES PATENT OFFICE 2,061,583

HYDROCARBON OIL TREATMENT

William M. Malisoff, Philadelphia, and Fred G. Hess, Lansdowne, Pa., assignors to The Atlantic Refining Company, Philadelphia, Pa., a corporation of Pennsylvania Application May 7, 1934, Serial No. 724,422

12 Claims. (Cl. 196—36)

The present invention relates to the art of mineral oil refining, and more particularly to the treatment of petroleum and petroleum distillates to eliminate or reduce the gum and/or color forming constituents, sulfur compounds and other impurities contained therein.

Our invention effects improvement from the standpoint of color stability, gum stability, reduction of the amount of material lost in refining as polymers, sludge, and non-condensible gas, and in the case of motor fuel fractions the avoidance of impairment of knock rating. Our invention is particularly applicable to color and gum stabilization of low boiling hydrocarbon distillates, such as gasoline and kerosene, and more especially to cracked distillates of the motor fuel boiling range. However, our process may also be applied to less volatile petroleum fractions, including lubricating oils, for the reduction and stabilization of color of the same, and for the improvement of stability under oxidizing conditions.

While the present invention is of broad application in the treatment of oils to improve the same, we feel that its greatest utility is in the treatment of crude motor fuels for the purpose of rendering the same stable, i. e., to so treat them that the products will possess excellent characteristics of color, gum content, and the like, and will not undergo substantial changes in composition resulting in the formation of gum and color imparting bodies on prolonged standing under varying conditions of storage. It is well known that many commercial motor fuels, particularly cracked gasolines, deposit gummy or resinous polymers and deteriorate in color upon storage over extended periods of time, and that the knock rating is very often impaired. Furthermore, even where a motor fuel may not show a gum or resinous deposit upon storage over a long period, such polymers may exist in solution and their presence may become manifest when the fuel is used in an internal combustion engine. It is the elimination of these objectionable impurities, or the parent substances which lead to gum and color formation in mineral oils, and more specifically in motor fuel fractions, that constitutes one of the principal objects of the present invention.

In accordance with our invention, petroleum or petroleum distillates, preferably in the vapor phase, are brought into contact either concurrently or counter-concurrently, with a reagent consisting of an oxygen-containing compound and a condensing agent, at a temperature on the order of from 150° C. to 300° C., the reagent preferably having a boiling point sufficiently above the temperature of the hydrocarbons under treatment to prevent material vaporization of said reagent. We have found that a class of oxygen-containing compounds particularly suitable for use in our process, are phenolic compounds, especially the higher phenols, such as resorcinol, pyrogallol and naphthol, and their homologues. In general, by phenolic compounds, we mean derivatives containing the phenyl group, the naphthyl group, the anthracyl group, and the like, in conjunction with one or more hydroxyl groups. Of those containing one hydroxyl group, phenol, cresol, and the naphthols will serve as illustrations.

The aforesaid oxygen-containing compounds may be used alone, but contacting of the hydrocarbons at elevated temperatures is preferably carried on in the presence of a condensing agent, as for example, any of the various phosphoric acids, particularly pyro-phosphoric acid, or a mixture of phosphoric acids, and/or in the presence of an inorganic halide, such as zinc chloride. Our preferred phosphoric acid mixture consists of the product obtained by heating any strength of phosphoric acid below 100% until the water expelled would lead to an expectation of substantially 100% pyro phosphoric acid, of the composition $H_4P_2O_7$, so that actually there are present $H_3PO_4$, $H_4P_2O_7$, and $HPO_3$ but no $P_2O_5$. In some cases, the addition of another condensing agent, such as boric anhydride or boric acid, may be desirable.

While we prefer to contact the hydrocarbon oil with a mixture of the two classes of reagents, i. e., a mixture of an oxygen-containing compound of the phenolic type and a condensing agent of the phosphoric acid type, as for example, cresol and phosphoric acid as above described, it is not essential in our process to use an admixture in order to reduce the gum and color imparting bodies contained in the oil, and in order to effect a stabilization of color and gum in the finished product. Thus, we may use the reagents in series, in which case particularly good results are obtained by contacting the hydrocarbon oil with the oxygen-containing compound, and then with the condensing agent. Furthermore, we may contact the oil either before or after treatment, with a mixture of the two classes of reagents, or with either class alone.

While we do not commit ourselves to any particular theory or explanation, we visualize the reaction which takes place to be the following: The phenolic compound enters into combination with gum forming material and also with color bodies and color forming bodies. These reactions are accelerated by the presence of condensing agents. The phosphoric acid, therefore, acts as the condensing agent for these reactions. Simultaneously, the phosphoric acid also affects the polymerization of some of the most unsaturated hydrocarbon impurities. The products of these reactions are heavy, high boiling materials which remain as a sludge. On the other hand, other reactions occur in which more or less volatile materials are formed which are valuable. Of such a character are the possible condensation products of the phenolic bodies with unsaturated and aromatic constituents of the original oils to form complex derivatives which still retain a phenolic character. These products are volatile to some extent with the vapors of the oils to be refined, and constitute inhibitors of gum formation and of the formation of color bodies. We thus accomplish both a scrubbing and synthetic action leading to the desired results.

For a clearer understanding of our process reference is made to the accompanying drawing which illustrates one form of apparatus suitable for carrying on our process.

The hydrocarbon oil to be refined is vaporized in a suitable apparatus, such as a pipe still 1, and the vapors are passed, by means of pipe 2 into heat insulated reaction vessel 3, which by reason of the heated vapors, is maintained at a temperature suitable for efficient reaction, for example, of the order of from 150° C. to 250° C. The vessel 3 is packed with a material 4, such as broken pumice, coke or other inert material, which will provide a large contact surface. The treating agent is introduced into the top of vessel 3 and distributed over the packing 4 by means of header 5. The vapors entering the bottom of vessel 3 from pipe 2 pass upwardly and in countercurrent contact with the descending treating agent, whereby intimate contact is obtained and efficient reaction is effected. The treated vapors are withdrawn from the top of vessel 3, and are introduced by means of pipe 6 into the lower part of heat insulated fractionating column 7, which is provided at its lower end with heating coil 8. Herein the treated vapors are fractionated, the heavy polymers and tar being withdrawn from the bottom of the column and either returned to the top of the reaction vessel 3 by means of pipe 9, pump 9a and valve controlled pipe 9b, or withdrawn from the system thru valve-controlled pipe 10. The vapors taken from the top of column 7 are passed by means of pipe 11 into partial condenser 12 provided with cooling coil 13. Herein partial condensation of the vapors is effected, the condensate being drawn from the bottom of the condenser and passed thru valve-controlled pipe 14 to the top of column 7, to serve therein as reflux. The uncondensed vapors from the top of condenser 12 are passed thru pipe 15 to a condensation system (not shown), wherein the vapors are condensed to form the desired stabilized product.

The treating agent, having descended thru the packed reaction vessel 3 and in contact with the vapors to be treated, is withdrawn from the bottom of vessel 3 and passed by means of pipe 16, pump 16a and pipe 16b into the upper part of separator 17, the lower end of which is provided with valve-controlled drawoff 26. The treating agent introduced into separator 17 carries with it a portion of the products, i. e., sludge and polymers, formed during the contacting in reaction vessel 3. This mixture is allowed to stratify in separator 17 into a three layer system, the upper layer consisting of polymers, the middle layer of sludge, and the lower layer of treating agent. The polymers, sludge and treating agent may be withdrawn individually from the separator by means of the valve-controlled pipes 18, 19 and 20 respectively. But the treating agent is preferably recirculated to the top of reaction vessel 3 by means of pipe 21, pump 22 and pipe 23. Fresh treating agent may be introduced into the system thru valve-controlled pipe 25 which latter communicates with pipe 21. In the event that it is desirable to recycle the polymers from the top of separating vessel 17, to the reaction vessel 3, said polymers may be allowed to build up in vessel 17 to such an extent that they will flow into vessel 3 by means of pipe 24.

In operating the fractionating column 7, proper adjustment for efficient refluxing and rectification may be made, depending upon the velocity of passage of vapors. Similarly, reaction time and rate of recirculation of treating agent and polymers into chamber 3 is regulated according to the nature of the process, the variety of the naphtha, the amount of treating agent employed, and like factors. Our treatment may be carried out under atmospheric, reduced, or elevated pressure, depending upon the character of the oil to be treated and the temperature conditions required. In general, the temperature of the treatment is preferably that at which the hydrocarbon vapors are formed and the temperature of vapor formation may be increased or decreased by varying the absolute pressure of the vaporizing system, or by the use of distillation aids such as steam.

Instead of carrying out our treatment according to the above described method, we may maintain a body of liquid reagent in the reaction vessel at a desired temperature, pass the vapors through the said heated body of reagent, thereby to obtain intimate contacting of hydrocarbon vapors and reagent, and thereafter remove the treated vapors from the said vessel. While we prefer to pass the hydrocarbon vapors, as such, through the treating liquid, it is to be understood that hydrocarbon oils may be contacted in the liquid phase with the reagent, and separated therefrom by vaporization. Regardless of the method of contacting, the treated hydrocarbon oil may be fractionally distilled after said treatment in order to remove polymers and traces of tar which may have been carried over from the reaction vessel. Also, in the treatment of oils containing substantial quantities of sulfur compounds, the treated oil may be contacted with caustic alkali solution or other similar functioning reagent to effect removal of hydrogen sulfide, which may result from the decomposition of said sulfur compounds. In such cases, a sweetening procedure may also be employed, when desirable.

The time of reaction depends upon the oil being treated and the difficulty encountered in effecting refining to the desired degree. Adequate results may be obtained by the employment of reaction times as low as a fraction of a second and as high as one or two minutes, without unduly unbalancing the process. It will be apparent to those skilled in the art that there may be many ways of recycling polymers, or of setting up different degrees of rectification, and of making different types of cuts. The treating agent may be deposited on various materials, for example, on coke, silica gel, or clay, and the contacting may be effected by means of liquid pools, sprays or the like. In some cases we may blow the polymers with air before recycling or admix a small amount of air with the hydrocarbons undergoing treatment.

The recovery of refining agent such as may be entrained in the sludge, may be accomplished by water washing, employing minimum amounts of water. In practice this has been found to range from 15 to 100% of the acid contained in the sludge. The recovered treating agent may be concentrated by any of the conventional methods employed for concentrating aqueous solutions. We have found it most practical to return the diluted treating agent directly to the process where it undergoes concentration in the upper section of the packed reaction vessel.

We have found, moreover, that one of the outstanding advantages of the use of phosphoric acid is that it has no oxidizing action whatsoever. There are no losses due to that effect and there is no appreciable volatility or tendency to combine with hydrocarbons to form phosphoric derivatives. Nitrogenous bases, if present in the hydrocarbon oil, may be concentrated by the phosphoric acid reagent so that in exceptional cases, when naphthas contain such bases in appreciable amounts, it may be advisable to precede our process by a scrubbing with dilute acid.

The following examples illustrate the results which may be obtained by our process:

An untreated pressure still distillate was contacted, in an apparatus of the character of that described above, with a treating agent consisting of 1 part of cresylic acid and 3 parts of a phosphoric acid corresponding to the composition $H_4P_2O_7$, at a temperature of from about 180° C. to about 200° C. The average time of contact between the distillate vapors and the treating agent was of the order of 2 seconds, and the yield of stabilized distillate amounted to 6000 bbls./ton of phosphoric acid used, the loss of material as polymers and gas being less than 1%. The stabilized distillate thus produced had a Saybolt color of 30+, a copper dish gum content of 5 mg./100 cc., and an induction period of 26 hours by the oxygen bomb test. The sulfur content of the distillate was reduced by 10%, and upon storage of a sample of the stabilized distillate for a period of 6 months there resulted only a slight change in color and induction period.

An untreated cross distillate was contacted, in an apparatus of the character of that described above, with a treating agent consisting of 1 part of α-naphthol and 3 parts of a phosphoric acid corresponding to the composition $H_4P_2O_7$, at a temperature of about 200° C. The average time of contact between the distillate vapors and the treating agent was of the order of 2 seconds, and the yield of stabilized distillate amounted to 10,000 bbls./ton of phosphoric acid used, the loss of material as polymers and gas being less than 1%. The stabilized distillate thus produced had a Saybolt color of 30, a copper dish gum content of 5 mg./100 cc., and an induction period of 26 hours. Storage of a sample of the stabilized distillate for a period of 4 months resulted in no change in color and only a slight decrease in the induction period.

What we claim is:

1. The process for refining petroleum hydrocarbon oil which comprises subjecting said hydrocarbon oil to thermal treatment in the presence of phosphoric acid and a phenolic compound.

2. The process for refining petroleum hydrocarbon oil which comprises subjecting said hydrocarbon oil at its boiling point to the action of phosphoric acid and a phenolic compound.

3. The process for refining a petroleum hydrocarbon distillate which comprises subjecting said distillate to thermal treatment in the presence of phosphoric acid and a phenolic compound.

4. The process for refining a petroleum hydrocarbon distillate which comprises subjecting said distillate at its boiling point to the action of phosphoric acid and a phenolic compound.

5. The process for refining petroleum hydrocarbon oil which comprises contacting said oil with phosphoric acid and a phenolic compound at a temperature of from about 150° C. to about 300° C.

6. The process for refining a petroleum hydrocarbon distillate which comprises contacting said distillate with phosphoric acid and a phenolic compound at a temperature of from about 150° C. to about 300° C.

7. The process for refining a gasoline distillate which comprises contacting said distillate substantially in the vapor phase with a mixture of phosphoric acid and a phenolic compound.

8. The process for obtaining refined gasoline from a cracked hydrocarbon distillate which comprises contacting said distillate substantially in the vapor phase with a mixture of phosphoric acid and a phenolic compound.

9. The process for refining petroleum hydrocarbon oil which comprises subjecting said hydrocarbon oil to thermal treatment in the presence of phosphoric acid and at least one compound from the group consisting of phenol, cresol, naphthol, resorcinol and pyrogallol.

10. The process for refining petroleum hydrocarbon oil which comprises subjecting said hydrocarbon oil to thermal treatment in the presence of pyrophosphoric acid and a phenolic compound.

11. The process for refining a petroleum hydrocarbon oil which comprises contacting said hydrocarbon oil with pyrophosphoric acid and at least one compound from the group consisting of phenol, cresol, naphthol, resorcinol and pyrogallol at a temperature of from about 150° C. to about 300° C.

12. The process for refining a gasoline distillate which comprises contacting said distillate with pyrophosphoric acid and at least one compound from the group consisting of phenol, cresol, naphthol, resorcinol and pyrogallol at a temperature of from about 150° C. to about 300° C.

WILLIAM M. MALISOFF.
FRED G. HESS.